(12) United States Patent
Wu et al.

(10) Patent No.: US 12,606,098 B2
(45) Date of Patent: Apr. 21, 2026

(54) VEHICLE-MOUNTED VOICE REMOTE CONTROL DEVICE

(71) Applicant: Shenzhen Coroads electronics limited, Shenzhen (CN)

(72) Inventors: Jianhong Wu, Shenzhen (CN); Jiang Hua, Shenzhen (CN)

( * ) Notice: Subject to any disclaimer, the term of this patent is extended or adjusted under 35 U.S.C. 154(b) by 49 days.

(21) Appl. No.: 18/733,807

(22) Filed: Jun. 4, 2024

(65) Prior Publication Data

US 2024/0317145 A1 Sep. 26, 2024

Related U.S. Application Data

(63) Continuation of application No. PCT/CN2022/130471, filed on Nov. 8, 2022.

(30) Foreign Application Priority Data

Dec. 15, 2021 (CN) .......................... 202123205118.2

(51) Int. Cl.
*B60R 11/00* (2006.01)
*G10L 15/22* (2006.01)
(52) U.S. Cl.
CPC .............. *B60R 11/00* (2013.01); *G10L 15/22* (2013.01); *B60R 2011/001* (2013.01); *B60R 2011/0057* (2013.01); *B60R 2011/0059* (2013.01)
(58) Field of Classification Search
None
See application file for complete search history.

(56) References Cited

U.S. PATENT DOCUMENTS

| | | | | |
|---|---|---|---|---|
| 7,548,770 B2 * | 6/2009 | Tsai | ........................ | H04M 1/23 |
| | | | | 455/90.3 |
| 7,810,783 B2 * | 10/2010 | Tsay | ...................... | B62D 1/043 |
| | | | | 248/230.8 |

(Continued)

FOREIGN PATENT DOCUMENTS

| | | |
|---|---|---|
| CN | 205344743 U | 6/2016 |
| CN | 211869302 U | 11/2020 |

(Continued)

OTHER PUBLICATIONS

Internatioanl Search Report and Writen Opinion of PCT/CN2022/130471, Mailed Jan. 28, 2023.

*Primary Examiner* — Steven M Marsh
(74) *Attorney, Agent, or Firm* — Sandy Lipkin

(57) ABSTRACT

Disclosed is a vehicle-mounted voice remote control device, including an assembly component and a voice remote control main body detachably assembled to the assembly component, the voice remote control main body further includes a magnetic member to enable the vehicle-mounted voice remote control device magnetically attracted with a steering wheel, the assembly component includes an assembly shell, and a magnetic attraction piece magnetically attracted with the magnetic member is disposed inside the assembly shell. The magnetic member is magnetically attracted with the steering wheel, and the voice remote control main body can be magnetically attracted with the assembly shell to facilitate the assembly of the voice remote control main body. Through magnetic attraction, a user can mount the vehicle-mounted voice remote control device in a more convenient manner, and wake up the voice of the mobile terminal while freeing his/her hands and guaranteeing safe driving.

9 Claims, 7 Drawing Sheets

(56)                    References Cited

U.S. PATENT DOCUMENTS

| | | | | |
|---|---|---|---|---|
| 8,505,792 | B1 * | 8/2013 | Jansen | B60R 11/0241 |
| | | | | 224/276 |
| D783,614 | S * | 4/2017 | Hao | D14/218 |
| 10,220,798 | B2 * | 3/2019 | Lowell | B60R 11/0252 |
| 10,821,908 | B2 * | 11/2020 | Blowers | G06F 1/1635 |
| 2007/0029359 | A1 * | 2/2007 | Smith | B60R 11/02 |
| | | | | 224/276 |
| 2007/0050061 | A1 | 3/2007 | Klein et al. | |
| 2011/0024470 | A1 * | 2/2011 | Hajarian | B60R 11/0252 |
| | | | | 224/276 |
| 2012/0080465 | A1 * | 4/2012 | Son | B62J 50/225 |
| | | | | 224/276 |

FOREIGN PATENT DOCUMENTS

| | | | | | |
|---|---|---|---|---|---|
| WO | WO-2009064886 | A2 * | 5/2009 | | B62D 1/046 |
| WO | WO-2010056647 | A2 * | 5/2010 | | B60R 11/02 |

* cited by examiner

VEHICLE-MOUNTED VOICE REMOTE CONTROL DEVICE

CROSS REFERENCE TO RELATED APPLICATION

This application is a continuation of International Patent Application No. PCT/CN2022/130471 with a filing date of Nov. 8, 2022, designating the United States, now pending, and further claims priority to Chinese patent application CN 202123205118.2 with a filing date of Dec. 15, 2021. The content of the aforementioned applications, including any intervening amendments thereto, are incorporated herein by reference.

TECHNICAL FIELD

The present disclosure relates to the technical field of vehicle-mounted communication, and particularly relates to a vehicle-mounted voice remote control device.

BACKGROUND

During driving, a driver needs to focus on driving, so he/she cannot divert his/her attention to operate a mobile phone or other mobile devices, such as answering calls, navigation, checking weather forecast, or playing music. Therefore, manual operation of a mobile terminal during driving by the driver will pose safety hazards. As a result, the driver usually uses a vehicle-mounted voice remote control device for instead of manual operation. However, it is difficult to choose an ideal location for the vehicle-mounted voice remote control device, when the location is too far away, the voice interaction will be affected; and different locations of the vehicle-mounted voice remote control device will easily lead to lose of the device.

SUMMARY

In view of defects in the prior art, the present disclosure aims to provide a vehicle-mounted voice remote control device.

In order to achieve the above objective, an embodiment of the present disclosure adopts the following technical solution:

The embodiment of the present disclosure provides a vehicle-mounted voice remote control device, including a voice remote control main body and an assembly component, where the voice remote control main body is detachably assembled to the assembly component, the voice remote control main body further includes a magnetic member to enable the vehicle-mounted voice remote control device magnetically attracted with a steering wheel, the assembly component includes an assembly shell, and a magnetic attraction piece magnetically attracted with the magnetic member is disposed inside the assembly shell.

Preferably, the assembly component further includes a binding belt fixed on the assembly shell, the binding belt is used for being bound to the steering wheel in a vehicle, the voice remote control main body is detachably assembled to the assembly shell, and the voice remote control main body includes a wireless communication module in communication with a mobile terminal for voice interaction with the mobile terminal.

Preferably, the voice remote control main body includes an upper casing, a lower casing installed on the upper casing, and a control panel installed in a space formed by the upper casing and the lower casing, the control panel includes the wireless communication module, and the control panel further includes a voice recognition module.

Preferably, the upper casing is a tawny lens, a silicone key board is assembled on the tawny lens, and the silicone key board corresponds to regulation switches on the control panel.

Preferably, the voice remote control main body further includes a battery electrically connected to the control panel, and the battery is located between the control panel and the lower casing.

Preferably, the magnetic member is disposed between the battery and the lower casing, and the magnetic member is bonded onto the lower casing.

Preferably, the assembly component further includes a decorative piece, and the decorative piece is bonded onto a bottom surface of the assembly shell to encapsulate the magnetic attraction piece on the bottom surface of the assembly shell.

Preferably, the voice remote control main body further includes a data interface disposed on the lower casing, and the data interface is electrically connected to the control panel.

Preferably, a side wall and/or a bottom wall of the assembly shell is further provided with anti-slip silicone to be assembled to the voice remote control main body through overmolding or double molding injection.

Preferably, one end of the binding belt is fixed to a bottom of a side surface of the assembly shell, the assembly shell is provided with a tension pole for the binding belt to be wound, and the tension pole is assembled on a top of the side surface of the assembly shell.

The voice remote control main body of the vehicle-mounted voice remote control device provided in the embodiment of the technical solution of the present disclosure is provided with the magnetic member to be magnetically attracted with the steering wheel, and the voice remote control main body can be magnetically attracted with the assembly shell to facilitate the assembly of the voice remote control main body. Through magnetic attraction, the user can mount the vehicle-mounted voice remote control device in a more convenient manner, and the user can wake up the voice of the mobile terminal while freeing his/her hands and guaranteeing safe driving.

BRIEF DESCRIPTION OF THE DRAWINGS

In order to describe the technical solutions in the embodiments of the specification more clearly, the accompanying drawings required for describing the embodiments are briefly described below. It should be understood that the accompanying drawings in the following description show merely some embodiments of the present disclosure and should not be considered as limiting the scope, and those of ordinary skill in the art would also be able to derive other accompanying drawings from these accompanying drawings without creative efforts.

DETAILED DESCRIPTIONS OF THE EMBODIMENTS

In order to make the objectives, technical solutions, and advantages of the embodiments of the present disclosure clearer, the technical solutions of the embodiments of the present disclosure will be described clearly and completely with reference to the accompanying drawings of the embodiments of the present disclosure. Apparently, the described embodiments are some, but not all, embodiments of the present disclosure. Components of the embodiments of the present disclosure, as generally described and illustrated in the accompanying drawings herein, may be disposed and designed in a wide variety of different configurations.

Therefore, the following detailed description of the embodiments of the present disclosure provided in the accompanying drawings is not intended to limit the scope of the present disclosure as claimed, but merely represents a selected embodiment of the present disclosure. It should be noted that, in the absence of conflict, the features in the embodiments of the present disclosure may be combined with each other, and the combined embodiments still fall within the scope of protection of the present disclosure.

Figure 1:
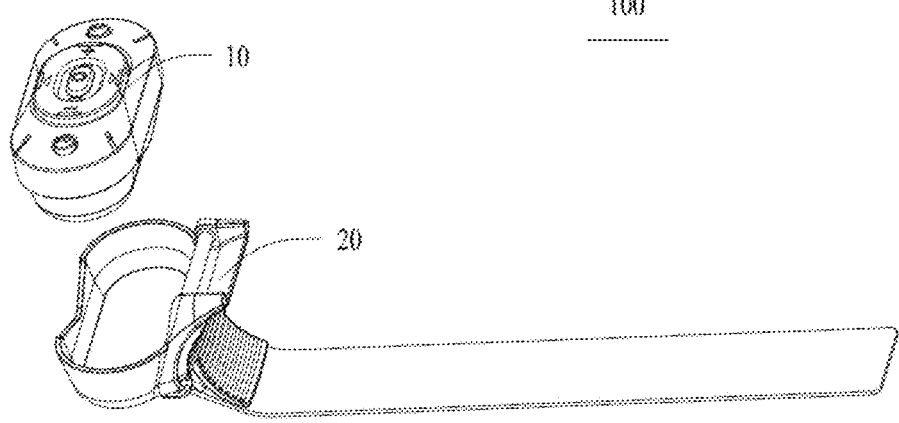
FIG. 1 is a structural schematic diagram of a vehicle-mounted voice remote control device provided in one embodiment according to the present disclosure.
Figure 2:
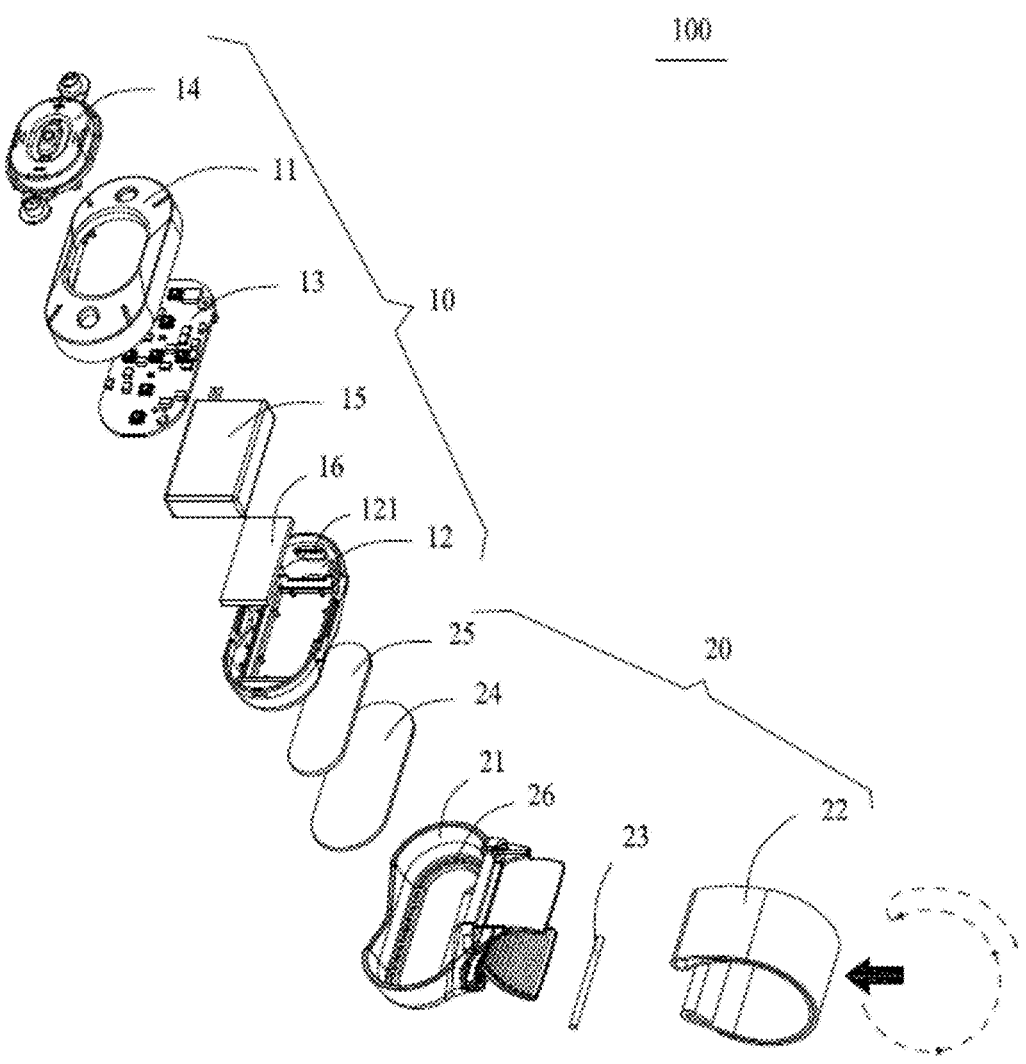
FIG. 2 is an exploded view of a vehicle-mounted voice remote control device provided in one embodiment according to the present disclosure.
Figure 3A:
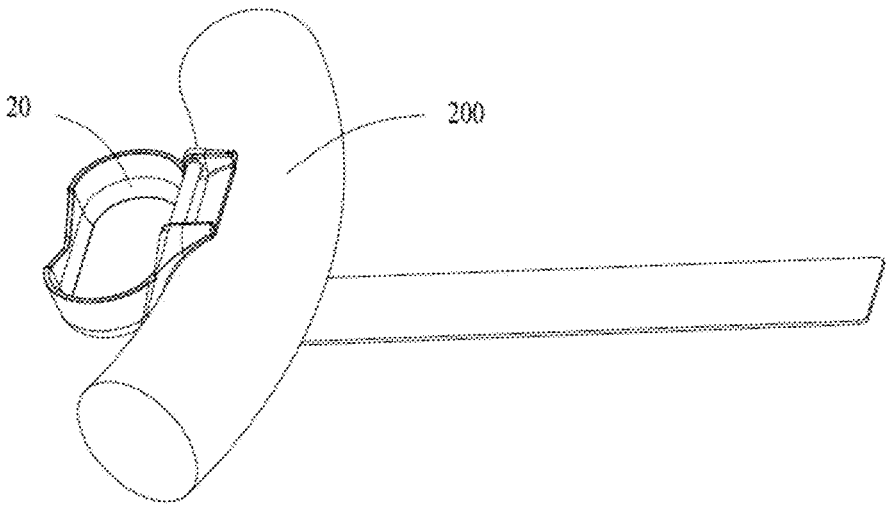
FIG. 3a is schematic diagrams of assembling a vehicle-mounted voice remote control device and a steering wheel provided in one embodiment according to the present disclosure.
Figure 3B:
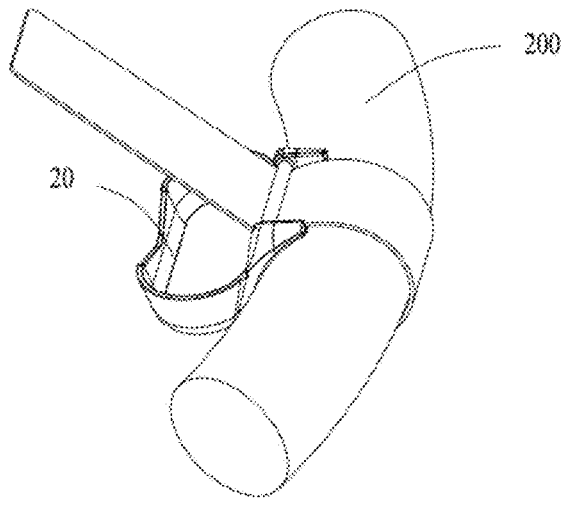
FIG. 3b is schematic diagrams of assembling a vehicle-mounted voice remote control device and a steering wheel provided in one embodiment according to the present disclosure.
Figure 3C:
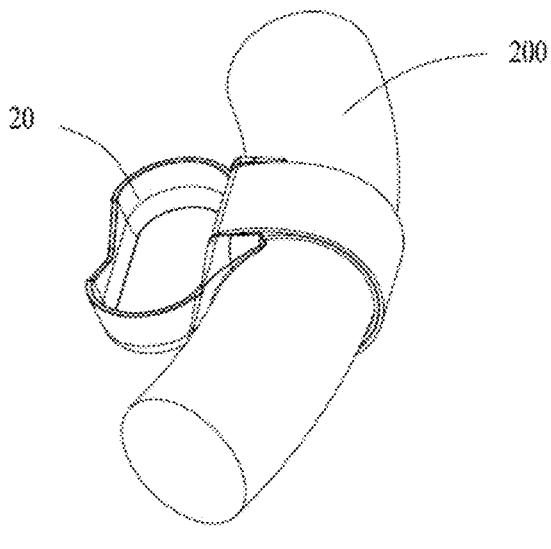
FIG. 3c is schematic diagrams of assembling a vehicle-mounted voice remote control device and a steering wheel provided in one embodiment according to the present disclosure.
Figure 4A:
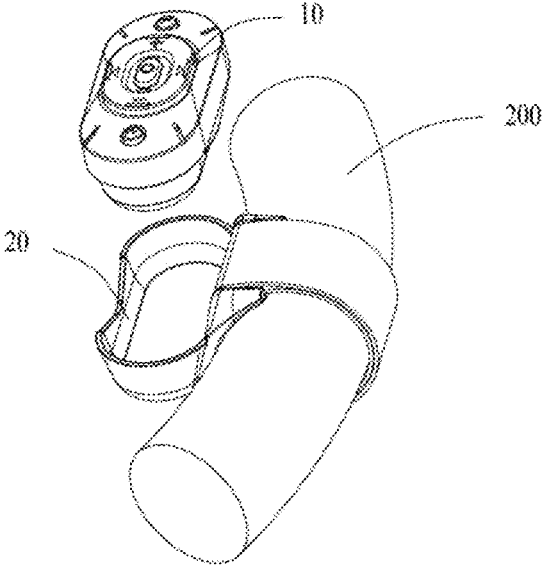
FIG. 4a is structural schematic diagrams of assembling a voice remote control main body in an assembly shell of a vehicle-mounted voice remote control device provided in one embodiment according to the present disclosure.
Figure 4B:
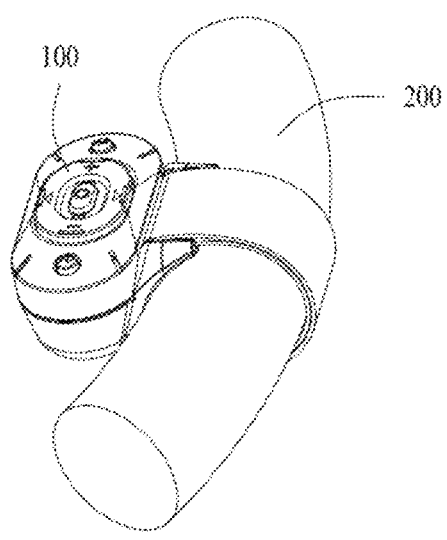
FIG. 4b is structural schematic diagrams of assembling a voice remote control main body in an assembly shell of a vehicle-mounted voice remote control device provided in one embodiment according to the present disclosure.

As shown in FIGS. 1-2, FIG. 1 is a structural schematic diagram of a vehicle-mounted voice remote control device in one embodiment according to the present disclosure; FIG. 2 is an exploded view of a vehicle-mounted voice remote control device in one embodiment according to the present disclosure; and a dotted line in the figure is an assembly direction of a binding belt, which is specifically folded from bottom to top and then fixed with Velcro. An embodiment of the present disclosure provides a vehicle-mounted voice remote control device 100, including a voice remote control main body 10 and an assembly component 20, where the voice remote control main body 10 is detachably assembled to the assembly component 20.

The voice remote control main body 10 further includes a magnetic member 16, such that the vehicle-mounted voice remote control device 100 can be magnetically attracted with the steering wheel 200. A magnet or an iron sheet is disposed on the steering wheel 200, facilitating the placement of the vehicle-mounted voice remote control device 100 more easily and randomly by a user; and the vehicle-mounted voice remote control device 100 is placed on the steering wheel 200 and has a more suitable distance from the user, such that voice interaction is facilitated.

The assembly component 20 includes an assembly shell 21, and correspondingly, a magnetic attraction piece 24 magnetically attracted with the magnetic member 16 is disposed inside the assembly shell 21. Through the cooperation of the magnetic member 16 and the magnetic attraction piece 24, the voice remote control main body 10 is attracted inside the assembly shell 21, where the magnetic member 16 is a strong magnetic sheet, and the magnetic attraction piece 24 is an iron sheet or a magnetic sheet. In the embodiment of the present disclosure, the magnetic member 16 is disposed between a battery 15 and a lower casing 12, and the magnetic member 16 is bonded onto the lower casing 12.

In the present disclosure, the assembly component 20 further includes a decorative piece 25, the decorative piece 25 can be made of leather, the decorative piece 25 is bonded onto a bottom surface of the assembly shell 21 to encapsulate the magnetic attraction piece 24 on the bottom surface of the assembly shell 21, such that an overall appearance of the assembly shell 21 is maintained, and the magnetic attraction piece 24 is hidden inside the assembly shell 21.

As shown in FIGS. 3a-3c and 4a-4b, the assembly component 20 is further fixed to a binding belt 22 on the assembly shell 21, where the binding belt 22 in this embodiment is a silicone binding belt. The binding belt 22 is used for being bound to the steering wheel 200 in a vehicle, such that the vehicle-mounted voice remote control device 100 is further bound to the steering wheel 200 on the basis of magnetic attraction. In the embodiment of the present disclosure, the vehicle-mounted voice remote control device 100 is bound to the steering wheel 200, which is beneficial to a driver to perform voice control, without affecting the driving.

One end of the binding belt 22 is fixed to a bottom of a side surface of the assembly shell 21, the assembly shell 21 is provided with a tension pole 23 for the binding belt 22 to be wound, the tension pole 23 is assembled on a top of the side surface of the assembly shell 21, and the tension pole 23 and the binding belt 22 are disposed on the same side of the assembly shell 21.

In this embodiment, an assembly bracket is extended from a top of the side, and the tension pole 23 is suspended on the assembly bracket through snap-in connection at two ends. When the binding belt 22 is bound, the binding belt 22 passes through the steering wheel under the tension pole 23 and then is folded back in an opposite direction, and is bonded by the Velcro on the binding belt 22. Of course, the fixing method of the binding belt 22 in the present disclosure is not limited thereto, and other methods of fixing in a cooperation manner are also applicable to the binding belt 22 of the present disclosure.

A side wall and/or a bottom wall of the assembly shell 21 is further provided with anti-slip silicone 26 to be assembled to the voice remote control main body 10 through overmolding or double molding injection. Specifically, an outer casing of the voice remote control main body is provided with plastic, and the anti-slip silicone 26 is combined with the plastic through overmolding or double molding injection, such that the anti-slip silicone 26 is more stably combined with the steering wheel. After the voice remote control main body 10 is assembled inside the assembly shell 21, the voice remote control main body 10 is attached to the anti-slip silicone 26, such that the voice remote control main body 10 is prevented from easily sliding out of the assembly shell 21 or easily moving relative to the assembly shell 21 after being assembled inside the assembly shell 21.

Further, with reference to FIGS. 1-2 again, the voice remote control main body 10 includes a wireless communication module in communication with a mobile terminal for voice interaction with the mobile terminal, such that the mobile terminal can be subjected to voice control, and the mobile terminal can be a mobile phone, a tablet computer, a business electronic device, and the like. In this embodiment, the mobile phone is taken as the mobile terminal, specifically, the mobile phone can be subjected to the voice control for answering calls, navigation, checking weather forecast, playing music, and the like. The mobile phone and the voice remote control main body 10 can perform data interaction through communication methods such as Bluetooth, network signals, infrared signals, and a radio frequency signals, and an APP or an applet capable of communicating with the voice remote control main body 10 can be installed on the mobile phone, facilitating data interaction.

Specifically, the voice remote control main body 10 includes an upper casing 11, the lower casing 12 assembled to the upper casing 11, and a control panel 13 installed in a space formed by the upper casing 11 and the lower casing 12. The control panel 13 can be fixed in the upper casing 11 or the lower casing 12. The control panel 13 includes the wireless communication module, where the control panel 13 further includes a voice recognition module, and the voice recognition module can recognize voice of the user and convert the voice into data recognizable by the mobile phone for interaction.

In the embodiment of the present disclosure, the upper casing 11 is a tawny lens, silicone key board 14 is assembled on the tawny lens, a silicone key board 14 corresponds to regulation switches on the control panel 13, and the regulation switches include startup and shutdown settings, signal matching adjustment, and the like.

Further, the voice remote control main body 10 further includes the battery 15 electrically connected to the control panel 13, and the battery 15 is configured to supply power to the control panel 13. In this embodiment, the battery 15 is located between the control panel 13 and the lower casing 12.

Further, the voice remote control main body 10 also includes a data interface 121 disposed on the lower casing 12, and the data interface 121 is electrically connected to the control panel 13 and configured to perform data interaction or charging with an external device.

The voice remote control main body of the vehicle-mounted voice remote control device in the present disclosure is provided with the magnetic member to be magnetically attracted with the steering wheel, and the voice remote control main body can be magnetically attracted with the assembly shell to facilitate the assembly of the voice remote control main body. Through magnetic attraction, the user can mount the vehicle-mounted voice remote control device in a more convenient manner, and the user can wake up the voice of the mobile terminal while freeing his/her hands and guaranteeing safe driving.

Although the preferred embodiments of the present disclosure have been described, additional alterations and modifications to those embodiments may be made by those skilled in the art once the basic inventive concept is apparent to those skilled in the art. Therefore, the appended claims are intended to be interpreted as including the preferential embodiments and all changes and modifications falling within the scope of the present disclosure.

It should be noted that the relation terms, for example, first, second, etc., are used herein merely for distinguishing one entity or operation from another entity or operation but do not necessarily require or imply that there exists any actual relation or sequence between these entities or operations. Furthermore, terms "comprising", "including" or any other variants thereof are intended to cover the non-exclusive including, thereby making that the process, method, object or apparatus comprising a series of elements comprise not only those elements but also other elements that are not listed explicitly or the inherent elements to the process, method, merchandise or apparatus. Without further limitations, an element limited by the phrase "comprising/including a" does not exclude that there exists another same element in the process, method, merchandise or apparatus comprising the element.

The above descriptions are only preferred embodiments of the present disclosure, and are not intended to be limiting of the present disclosure, and various changes and modifications may be made by those skilled in the art. Any modification, equivalent replacement, improvement, etc. made within the spirit and principle of the present disclosure shall fall within the protection scope of the present disclosure.

What it claimed is:

1. A vehicle-mounted voice remote control device, comprising a voice remote control main body and an assembly component, wherein the voice remote control main body is detachably assembled to the assembly component, the voice remote control main body further comprises a magnetic member to enable the vehicle-mounted voice remote control device to be magnetically attracted with a steering wheel, the assembly component comprises an assembly shell, and a magnetic attraction piece magnetically attracted with the magnetic member is disposed inside the assembly shell;

wherein a side wall or a bottom wall of the assembly shell is further provided with anti-slip silicone to be assembled to the voice remote control main body through overmolding or double molding injection.

2. The vehicle-mounted voice remote control device according to claim 1, wherein the assembly component further comprises a binding belt on the assembly shell, the binding belt is used for being bound to the steering wheel in a vehicle, the voice remote control main body is detachably assembled to the assembly shell, and the voice remote control main body comprises a wireless communication module in communication with a mobile terminal for voice interaction with the mobile terminal.

3. The vehicle-mounted voice remote control device according to claim 2, wherein the voice remote control main body comprises an upper casing, a lower casing assembled to the upper casing, and a control panel installed in a space formed by the upper casing and the lower casing, the control panel comprises the wireless communication module, and the control panel further comprises a voice recognition module.

4. The vehicle-mounted voice remote control device according to claim 3, wherein the upper casing is a tawny lens, and a silicone key board is assembled on the tawny lens, and the silicone key board corresponds to regulation switches on the control panel.

5. The vehicle-mounted voice remote control device according to claim 3, wherein the voice remote control main body further comprises a battery electrically connected to the control panel, and the battery is located between the control panel and the lower casing.

6. The vehicle-mounted voice remote control device according to claim 5, wherein the magnetic member is disposed between the battery and the lower casing, and the magnetic member is bonded onto the lower casing.

7. The vehicle-mounted voice remote control device according to claim 5, wherein the assembly component further comprises a decorative piece, and the decorative piece is bonded onto a bottom surface of the assembly shell to encapsulate the magnetic attraction piece on the bottom surface of the assembly shell.

8. The vehicle-mounted voice remote control device according to claim 3, wherein the voice remote control main body further comprises a data interface disposed on the lower casing, and the data interface is electrically connected to the control panel.

9. The vehicle-mounted voice remote control device according to claim 2, wherein one end of the binding belt is fixed to a bottom of a side surface of the assembly shell, the assembly shell is provided with a tension pole for the binding belt to be wound, and the tension pole is assembled on a top of the side surface of the assembly shell.

* * * * *

8